(12) United States Patent
Lee et al.

(10) Patent No.: US 9,102,845 B2
(45) Date of Patent: Aug. 11, 2015

(54) FUNCTIONALIZED ISOBUTYLENE-ISOPRENE COPOLYMER COMPOSITION

(71) Applicant: 3M INNOVATIVE PROPERTIES COMPANY, St. Paul, MN (US)

(72) Inventors: Hae-Seung Lee, Woodbury, MN (US); Babu N. Gaddam, Woodbury, MN (US); Robert A. Asmus, Hudson, WI (US); Steven D. Theiss, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/400,827

(22) PCT Filed: Jun. 17, 2013

(86) PCT No.: PCT/US2013/046062
§ 371 (c)(1),
(2) Date: Mar. 2, 2015

(87) PCT Pub. No.: WO2014/014594
PCT Pub. Date: Jan. 23, 2014

(65) Prior Publication Data
US 2015/0175829 A1    Jun. 25, 2015

Related U.S. Application Data

(60) Provisional application No. 61/673,587, filed on Jul. 19, 2012, provisional application No. 61/764,726, filed on Feb. 14, 2013.

(51) Int. Cl.
| | | |
|---|---|---|
| C09D 153/02 | (2006.01) | |
| C09D 109/06 | (2006.01) | |
| C08K 5/315 | (2006.01) | |
| C09D 123/28 | (2006.01) | |

(52) U.S. Cl.
CPC .................................. C09D 123/283 (2013.01)

(58) Field of Classification Search
CPC ..... C09D 153/02; C09D 109/06; C08K 5/315
USPC ...................................................... 524/504
See application file for complete search history.

(56) References Cited

U.S. PATENT DOCUMENTS

| | | |
|---|---|---|
| 3,159,662 A | 12/1964 | Ashby |
| 3,178,464 A | 4/1965 | Pierpoint |
| 3,220,972 A | 11/1965 | Lamoreaux |
| 3,313,773 A | 4/1967 | Lamoreaux |
| 3,410,886 A | 11/1968 | Joy |
| 3,470,225 A | 9/1969 | Knorre |
| 3,567,755 A | 3/1971 | Seyfried |
| 3,715,334 A | 2/1973 | Karstedt |
| 3,775,452 A | 11/1973 | Karstedt |
| 3,814,730 A | 6/1974 | Karstedt |
| 3,814,731 A | 6/1974 | Nitzsche |
| 4,230,815 A | 10/1980 | Itoh |
| 4,276,252 A | 6/1981 | Kreis |
| 4,288,345 A | 9/1981 | Ashby |
| 4,510,094 A | 4/1985 | Drahnak |
| 4,530,879 A | 7/1985 | Drahnak |
| 4,603,215 A | 7/1986 | Chandra |
| 4,640,939 A | 2/1987 | Cavezzan |
| 4,670,531 A | 6/1987 | Eckberg |
| 4,699,813 A | 10/1987 | Cavezzan |
| 4,705,765 A | 11/1987 | Lewis |
| 4,712,092 A | 12/1987 | Boldridge, Jr. |
| 4,916,169 A | 4/1990 | Boardman |
| 5,140,084 A | 8/1992 | Mikuni |
| 6,376,569 B1 | 4/2002 | Oxman |
| 6,607,631 B1 | 8/2003 | Badejo |
| 7,001,947 B2 | 2/2006 | Cordova |
| 7,641,893 B2 | 1/2010 | Salamone |

FOREIGN PATENT DOCUMENTS

| | | |
|---|---|---|
| EP | 238033 | 9/1987 |
| JP | 2004-346189 | 12/2004 |
| WO | 2013-049527 | 4/2013 |
| WO | 2013-049543 | 4/2013 |

OTHER PUBLICATIONS

International Search Report for PCT International Application No. PCT/US2013/046062 mailed on Jul. 25, 2013, 3 pages.

*Primary Examiner* — James J Seidleck
*Assistant Examiner* — Deve E Valdez
(74) *Attorney, Agent, or Firm* — Kent S. Kokko

(57) ABSTRACT

A siloxane-functional isobutylene copolymer and use thereof is described. The copolymer is of the formula: <Please insert the chemical formula here as it appears in the paper copy.> wherein a is at least 20, and at least one of b and c are at least one, X is oxygen or nitrogen; R1 is a covalent bond or a divalent (hetero)hydrocarbyl group; Sil is a polydialkylsiloxane; and x is 1 or 2.

(I)

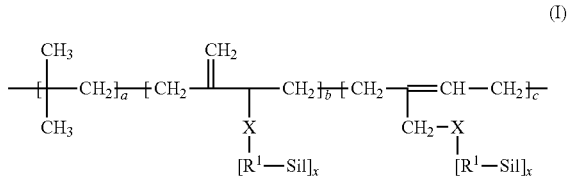

16 Claims, No Drawings

FUNCTIONALIZED ISOBUTYLENE-ISOPRENE COPOLYMER COMPOSITION

CROSS REFERENCE TO RELATED APPLICATIONS

This application is a national stage filing under 35 U.S.C. 371 of PCT/US2013/046062, filed Jun. 17, 2013, which claims priority to Provisional Application No. 61/673,587 filed Jul. 19, 2012, and Provisional Application No. 61/764,726 filed Feb. 14, 2013, the disclosure of which is incorporated by reference in its/their entirety herein.

BACKGROUND

Isobutylene-isoprene elastomers are used in the manufacture of adhesives, agricultural chemicals, fiber optic compounds, ball bladders, caulks and sealants, cling film, electrical fluids, lubricants (2 cycle engine oil), paper and pulp, personal care products, pigment concentrates, for rubber and polymer modification, for protecting and sealing certain equipment for use in areas where chemical weapons are present, as a gasoline/diesel fuel additive.

In many such applications, the high surface friction limits the use. In particular, molded articles such as gaskets, bladders, and seals are difficult to remove from molds, causing damage of the molded article and contamination of the mold. Many such molded articles require the use of additives to reduce the surface friction.

Typically, elastomers can demonstrate blocking behavior. The surface of the coating will not feel tacky but when two of the coated surfaces come in contact with one another, the coated surfaces show an affinity to each other and will adhere. Further, the elastomeric coatings can have increased frictional forces, or drag, between the elastomeric coating and an external surface.

Many conventional blocking agents are known, which are added to elastomers, or surface thereof, to reduce the surface friction and blocking. An anti-blocking agent, such as fatty alcohol, fatty alcohol esters and ethers as well as waxy polymers may be added to the elastomeric coating composition. Other waxy materials could also be used to reduce blocking. However, the conventional anti-blocking agents may reduce the overall elongation properties of the coating.

Silicones such as polydimethylsiloxane have been used to reduce the blocking behavior of elastomeric coatings. However, silicones are not compatible with most hydrocarbon elastomers such as butyl rubbers, and tend to phase-separate when coated, reducing the physical properties of the coatings. Further, due to the incompatibility, the silicones and elastomers tend to phase-separate when dissolved in organic solvents, rending uniform, homogeneous coatings difficult.

SUMMARY

The present disclosure is related to novel silicone-functionalized isobutylene-isoprene copolymer compositions. The novel copolymer is particularly suited as an additive for non-functional elastomers. The present disclosure provides coating compositions comprising the silicone-functionalized isobutylene-isoprene copolymer and a non-functional elastomer that may be coated on a substrate to provide a coating that is conformal to the surface of the substrate, has good adhesion to the substrate, flexible and extensible. Alternatively, the instant silicone-functionalized copolymer may be compounded with elastomers, and cast or molded into articles, such as seals or gaskets, having reduced surface friction, while maintaining desirable mechanical properties. In particular the silicone-functionalized copolymer may be used as an additive to provide coatings having reduced surface friction.

The present silicone-functionalized copolymers overcome the problems in the art by providing stable coating compositions of the silicone-functionalized copolymer, a non-functional elastomer, and an organic solvent. The resulting coating requires only evaporation of the solvent, and no additional application of anti-blocking agents such as talc, silica, and silicone fluids. The coatings also exhibit a reduced tendency to block, have lower surface energies, reduced friction and can provide longer service time than other anti-blocking agents. The conventional agents can be easily removed by contacting with other objects but coatings based on this technology will maintain the desirable surface properties for long period of time dues to the compatibility of the copolymer in the elastomer matrix.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent.

As used herein, "aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

DETAILED DESCRIPTION

The present disclosure provides novel silicone-functionalized copolymer of the formula:

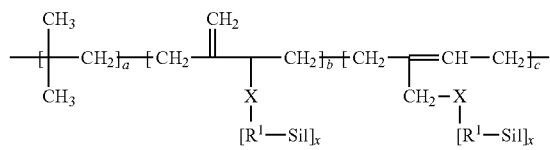

wherein
a is at least 20, and at least one of b and c are at least one,
X is oxygen or nitrogen
$R^1$ is a covalent bond or divalent (hetero)hydrocarbyl group, including alkylene or arylene, said alkylene optionally substituted with one of more catenary ether oxygen atoms, e.g. "—$R^{13}$—O—$R^{14}$—, where $R^{13}$ and $R^{14}$ are alkylene;
Sil is a polydiorganosiloxane, and
each x is 1 or 2.

In most embodiments the degree of substitution of the silicone-functionalized copolymer is such that the resulting the weight percent of the Sil groups in the copolymer is greater than 0.1 to less than 70 wt. %.

The copolymer of formula I is generally prepared by hydrosilation of an isobutylene/isoprene copolymer having a pendent unsaturated group by a hydrido polydiorganosiloxane, generally catalyzed by a platinum catalyst. The starting isobutylene/isoprene copolymer, having a pendent unsaturated groups, may be prepared by nucleophilic displacement of a halogenated isobutylene/isoprene copolymer by an unsaturated compound having a nucleophilic functional group.

The isobutylene/isoprene copolymer, having pendent, free-radically polymerizable, ethylenically unsaturated groups, may be derived from halogenated butyl rubber and is of the general formula:

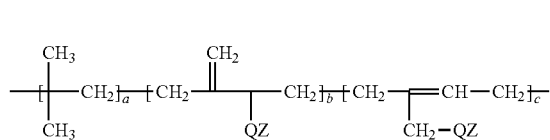

wherein a is at least 20, and at least one of b and c are at least one, Q is a polyvalent linking group and Z is a pendent, free-radically polymerizable, ethylenically unsaturated group.

More particularly, the -Q-Z moiety may be of the formula:

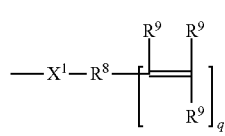

wherein
$X^1$ is —O—, —$O_2C$—, —$NR^{10}$—, where $R^{10}$ is H or $C_1$-$C_4$ alkyl, or —$R^8$—$C(R^9)$=$CR^9_2$; $R^8$ is a multivalent saturated or unsaturated alkylene or arylene, each $R^9$ is independently selected from H or $C_1$-$C_4$ alkyl, and any two of the $R^5$ groups may be taken together to form a carbocyclic ring and q is 1 or 2.

The copolymer of Formula II is generally prepared by nucleophilic displacement of commercially available halogenated PIBs, including halogenated poly(isobutylene-co-isoprene). Alternatively, a non-halogenated PIB-based material may be halogenated, then subsequently substituted. The halogen moiety in those materials allows introduction of the pendent ethylenically unsaturated groups.

The reaction scheme involves a displacement reaction with a "nucleophilic ethylenically unsaturated compound"; an organic compound with at least one nucleophilic functional group and least one ethylenically unsaturated group (hereinafter a "nucleophilic unsaturated compound"). The unsaturated group may be an alkenyl, including vinyl, allyl or allyloxy and the nucleophilic functional group may be an amino, carboxyl or hydroxy group. As carboxyl groups are less nucleophilic than hydroxyl or amines, the nucleophilic substitution may be enhanced by using a phase-transfer catalyst such as tetra-n-butylammonium hydroxide.

In some embodiments, the nucleophilic unsaturated compound is a polyunsaturated compound having a hydroxyl group and one or more unsaturated groups, including terpene alcohols and acids, which are derived from plant materials. In other embodiments, the nucleophilic unsaturated compound consists of a carboxy group with one or more unsaturated groups such as those carboxy compounds derived from unsaturated fatty acids such as linoleic acid, linolenic acid, and arachidonic acid.

Terpene alcohols and acids are a well-defined class of compounds that are based on five-carbon isoprene units and have at least one hydroxyl, which can be primary, secondary, or tertiary or carboxylic acid group. The terpene alcohols and acids are acyclic or mono-, bi- or tricyclic, mono- or polyolefinically unsaturated alcohols of vegetable origin containing, between 10 and 40 carbon atoms. Terpene alcohols and acids are structurally similar to terpene hydrocarbons except the structure also includes some hydroxyl or carboxyl functionality. Terpene alcohols and acids may be found in essential oils and are generally available through commercial sources.

Examples of unsaturated aliphatic terpene alcohols include geraniol, nerol, citronellol, hydroxycitronellol, linalool, α-terpenol, borneol, isoborneol, terpinen-4-ol, limonen-4-ol, carveol, lavandulol, menthol, 8-p-cymenol, cis-pinanol, trans-pinanol, dihydromyrcenol, myrcenol, dihydrolinalool, isomenthol, neomenthol, isopulegol, trans-p-menthane-3,8-diol, isoborneol, globulol, cedrol, menthol, sobrerol, umbellulol, nerolidol, pinanediol, farnesol, frenchyl alcohol, eugenol, phytol, isophytol, phytantriol, verbenol, trans-pinocarveol, carveol, nopol, cimenol, piperitol, anethol, camphenol, limonenol, abietyl alcohol, dihydroabietyl alcohol, 2-hydroxy-methyl-5-norborene, 6,6-dimethyl bicyclo(3,1,1)-2-heptene-2-ethanol, and combinations thereof. As will be understood, the corresponding amine or carboxyl substituted terpenes may also be used.

In such embodiments, where the nucleophilic unsaturated compound is derived from terpene alcohols or acids, this disclosure provides an adhesive composition derived from renewable resources The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant.

In some embodiments useful unsaturated nucleophilic compounds include those of the formula:

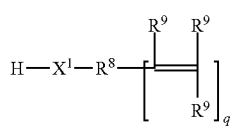

wherein
$X^1$ is —O—, —O$_2$C—, —NR$^{10}$—, where R$^{10}$ is H or C$_1$-C$_4$ alkyl, or —R$^8$—C(R$^9$)═CR$^9{}_2$; R$^8$ is a multivalent saturated or unsaturated alkylene or arylene, and each R$^9$ is independently selected from H or C$_1$-C$_4$ alkyl, and any two of the R$^9$ groups may be taken together to form a carbocyclic ring, such as are found in many terpene alcohols, and q is 1 or 2. Preferably q is greater than 1. The resulting nucleophilic polyunsaturated compounds allow the addition of multiple crosslinking sites on the copolymer.

Scheme 1

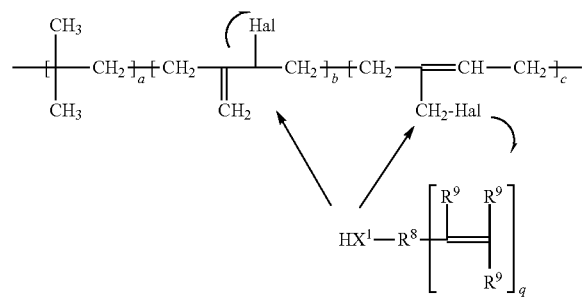

where
$X^1$ is —O—, —O$_2$C—, —NR$^{10}$—, where R$^{10}$ is H or C$_1$-C$_4$ alkyl, or —R$^8$—C(R$^9$)═CR$^9{}_2$; R$^8$ is a multivalent saturated or unsaturated alkylene or arylene, and each R$^9$ is independently selected from H or C$_1$-C$_4$ alkyl, and any two of the R$^9$ groups may be taken together to form a carbocyclic ring, such as are found in many terpene alcohols, and q is 1 or 2;
Hal is a leaving group such as a halide, and preferably a bromide,
a is at least 20, and at least one of b and c are at least one.

As can be seen in the above scheme, the isobutylene copolymer having pendent, free-radically polymerizable, ethylenically unsaturated groups is prepared by nucleophilic displacement of a halogenated isobutylene copolymer, with a nucleophilic ethylenically unsaturated compound. In addition to the depicted Sn2 displacement, allylic displacement of the halide may also occur. All or a fraction of the halide leaving groups may be displaced by the compound of Formula IV.

For compounds of formula III which do not have strong nucleophilic groups, such as a carboxylate group, a displacement is enhanced with the use of a phase-transfer catalyst. Any of such catalysts which are stable and effective under the prevailing reaction conditions may be used. Particularly preferred are the tetraalkylammonium halides, such as tetra-n-butylammonium salts. Generally the compound of formula III is added in molar excess relative to the amount of halide groups (Hal in Scheme 1). Most often, the ratio of equivalents of pendent halide groups to moles of nucleophilic groups is about 0.5-1.5:1, and the weight ratio of phase transfer catalyst to base is about 0.01-0.3:1.

Compounds of Formula IV include terminally mono-, di- or poly-unsaturated ethers of polyols such as 1,3-butylene glycol, 1,4-butanediol, 1,6-hexanediol, cyclohexane dimethanol, neopentyl glycol, caprolactone modified neopentylglycol hydroxypivalate, diethylene glycol, dipropylene glycol, bisphenol-A, trimethylolpropane, neopentyl glycol, tetraethylene glycol, tricyclodecanedimethanol, triethylene glycol, tripropylene glycol; glycerol, pentaerythritol, and dipentaerythritol pentaacrylate.

Useful nucleophilic unsaturated compounds include hydroxyalkenes such as allyl alcohol, methallyl alcohol, allyloxyethyl alcohol, 2-allyloxymethylpropanol (from dimethylolethane), and 2,2-di(allyloxymethyl)butanol (from trimethylolpropane), as well as the corresponding amines, particularly diallylamine.

The product of the nucleophilic displacement by the compound of Formula IV is then hydrosilated to provide the requisite polysiloxane pendent group. The isobutylene copolymer having pendent, free-radically polymerizable, ethylenically unsaturated groups may be reacted with a hydrido polydiorganosiloxane is of the formula:

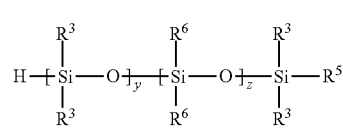

wherein
$R^3$ is each independently an alkyl, or aryl group;
$R^5$ is an alkyl, aryl, or —Si(R$^3$)$_2$R$^5$;
$R^6$ is an alkyl, aryl, or —Si(R$^3$)$_2$R$^5$;
z is 0 to 20; preferably 1-75;
y is at least, and
at least one of said R$^5$ or R$^6$ groups is H. Preferably a terminal R$^5$ group is H.

Numerous patents teach the use of various complexes of cobalt, rhodium, nickel, palladium, or platinum as catalysts for hydrosilylation between a compound containing silicon-bonded hydrogen such as formula V and a compound containing aliphatic unsaturation. For example, U.S. Pat. No. 4,288,345 (Ashby et al) discloses as a catalyst for hydrosilylation reactions a platinum-siloxane complex. Additional platinum-siloxane complexes are disclosed as catalysts for hydrosilylation reactions in U.S. Pat. Nos. 3,715,334, 3,775,452, and 3,814,730 (Karstedt et al). U.S. Pat. No. 3,470,225 (Knorre et al) discloses production of organic silicon compounds by addition of a compound containing silicon-bonded hydrogen to organic compounds containing at least one non-aromatic double or triple carbon-to-carbon bond using a platinum compound of the empirical formula PtX$_2$(RCOCR'COR'')$_2$ wherein X is halogen, R is alkyl, R' is hydrogen or alkyl, and R'' is alkyl or alkoxy.

The catalysts disclosed in the foregoing patents are characterized by their high catalytic activity. Other platinum complexes for accelerating the aforementioned thermally-activated addition reaction include: a platinacyclobutane complex having the formula (PtCl$_2$C$_3$H$_6$)$_2$ (U.S. Pat. No. 3,159,662, Ashby); a complex of a platinous salt and an olefin (U.S. Pat. No. 3,178,464, Pierpoint); a platinum-containing complex prepared by reacting chloroplatinic acid with an alcohol, ether, aldehyde, or mixtures thereof (U.S. Pat. No. 3,220,972, Lamoreaux); a platinum compound selected from trimethylplatinum iodide and hexamethyldiplatinum (U.S. Pat. No. 3,313,773, Lamoreaux); a hydrocarbyl or halohydrocarbyl nitrile-platinum (II) halide complex (U.S. Pat. No. 3,410,886, Joy); a hexamethyl-dipyridine-diplatinum iodide (U.S. Pat. No. 3,567,755, Seyfried et al); a platinum curing catalyst obtained from the reaction of chloroplatinic acid and a ketone having up to 15 carbon atoms (U.S. Pat. No. 3,814,731, Nitzsche et al); a platinum compound having the general formula (R')PtX$_2$ where R' is a cyclic hydrocarbon radical or substituted cyclic hydrocarbon radical having two aliphatic carbon-carbon double bonds, and X is a halogen or alkyl radical (U.S. Pat. No. 4,276,252, Kreis et al); platinum alkyne complexes (U.S. Pat. No. 4,603,215, Chandra et al.); platinum alkenylcyclohexene complexes (U.S. Pat. No. 4,699,813, Cavezzan); and a colloidal hydrosilylation catalyst provided by the reaction between a silicon hydride or a siloxane hydride and a platinum (0) or platinum (II) complex (U.S. Pat. No. 4,705,765, Lewis).

Although these platinum complexes and many others are useful as catalysts in processes for accelerating the hydrosilation, processes for promoting the ultraviolet or visible radiation-activated addition reaction between these compounds may be preferable in some instances. Platinum complexes that can be used to initiate ultraviolet radiation-activated hydrosilation reactions have been disclosed, e.g., platinum azo complexes (U.S. Pat. No. 4,670,531, Eckberg); ($\eta^4$-cyclooctadiene)diarylplatinum complexes (U.S. Pat. No. 4,530,879, Drahnak); and ($\eta^5$-cyclopentadienyl)trialkylplatinum complexes (U.S. Pat. No. 4,510,094, Drahnak). Other compositions that are curable by ultraviolet radiation include those described in U.S. Pat. Nos. 4,640,939 and 4,712,092 and in European Patent Application No. 0238033. U.S. Pat. No. 4,916,169 (Boardman et al) describes hydrosilylation reactions activated by visible radiation. U.S. Pat. No. 6,376,569 (Oxman et al.) describes a process for the actinic radiation-activated addition reaction of a compound containing silicon-bonded hydrogen with a compound containing aliphatic unsaturation, said addition being referred to as hydrosilylation, the improvement comprising using, as a platinum hydrosilylation catalyst, an ($\eta^5$-cyclopentadienyl) tri($\sigma$-aliphatic)platinum complex, and, as a reaction accelerator, a free-radical photoinitiator capable of absorbing actinic radiation, i.e., light having a wavelength ranging from about 200 nm to about 800 nm. The process can also employ, as a sensitizer, a compound that absorbs actinic radiation, and that is capable of transferring energy to the aforementioned platinum complex or platinum complex/free-radical photoinitiator combination, such that the hydrosilylation reaction is initiated upon exposure to actinic radiation. The process is applicable both to the synthesis of low molecular weight compounds and to the curing of high molecular weight compounds, i.e., polymers.

It will be appreciated that hydrosilation as described will lead to a —CH$_2$CH$_2$—Si— linkage.

The hydrido polyorganosiloxane of Formula V is generally used in amounts equimolar to the molar amounts of the pendent unsaturated groups of the product of Scheme 1 to produce the copolymer of Formula I.

Alternative to the reaction scheme above, where a halogenated butyl copolymer is first functionalized with unsaturated groups, then hydrosilated, the halogenated butyl copolymer may be reacted with a polysiloxane having a nucleophilic functional group of the formula:

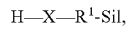                        VI where
R$^1$ is a covalent bond or a divalent (hetero)hydrocarbyl group;
Sil is a polydiorganosiloxane.

In some preferred embodiments, the halogenated butyl copolymer may be reacted with a nucleophilic silane of the formula:

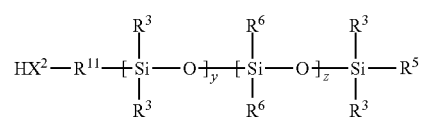

VII where
X$^2$ is —O— or —NR$^{12}$—, where R$^{12}$ is H or C$_1$-C$_4$ alkyl,
R$^{11}$ is a C$_2$-C$_{12}$ alkylene, optionally containing one or catenary ether oxygen atoms, e.g. alkyleneoxyalkylene;
R$^3$ is each independently an alkyl, or aryl group;
R$^5$ is an alkyl, aryl, or —Si(R$^3$)$_2$R$^5$;
R$^6$ is an alkyl, aryl, or —Si(R$^3$)$_2$R$^5$;
z is 0 to 200; preferably 1-75; and
y is at least 3.

In some particularly preferred embodiments, the compound of formula VII is selected as

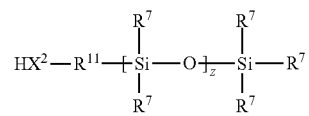

VIII

X$^2$ is —O— or —NR$^{12}$—, where R$^{12}$ is H or C$_1$-C$_4$ alkyl,
R$^{11}$ is a C$_2$-C$_{12}$ alkylene, optionally containing one or catenary ether oxygen atoms, e.g. alkyleneoxyalkylene;
each R$^7$ is independently an alkyl, and z is at least 10.

The novel copolymer is useful as an additive to various elastomers, and can provide coating compositions comprising the silicone-functionalized copolymer of Formula I, a non-functional elastomer, and an organic solvent. The instant silicone-functionalized copolymers are more compatible with non-functional elastomers, and show a reduced tendency to phase separate.

Useful elastomers that may be compounded with the copolymer include both rubbers and thermoplastic elastomer including polyisobutylenes, polyisoprenes, polybutadiene, butyl rubber, halogenated butyl rubbers, dienes, styrene rubber copolymers, acrylonitriles, and copolymers or mixtures thereof. Preferably, the elastomer is selected from unfunctionalized isobutylene (co)polymeric synthetic rubbers. The unfunctionalized isobutylene (co)polymeric synthetic rubbers are generally resins having a polyisobutylene main or a side chain. In some embodiments, the isobutylene (co)polymers are substantially homopolymers of isobutylene, for example, poly(isobutylene) resins available under the tradenames OPPANOL (BASF AG) and GLISSOPAL (BASF AG). In some embodiments, the isobutylene (co)polymeric resins comprise copolymers of isobutylene, for example, synthetic rubbers wherein isobutylene is copolymerized with another monomer. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

The unfunctionalized isobutylene (co)polymeric synthetic rubber (e.g. PIB) material typically has substantially higher molecular weight than the amine-functionalized (e.g. PIB) synthetic rubber material (described further below). In some embodiments, the weight average molecular weight ($M_w$) of the unfunctionalized isobutylene (co)polymeric synthetic rubber (e.g. PIB) is at least 35,000 grams per mole, at least 100,000 grams per mole, at least 250,000 grams per mole, at least 500,000 grams per mole, or even at least 1,000,000 grams per mole. The weight average molecular weight is typically no greater than 4,000,000 g/mole.

The unfunctionalized isobutylene (co)polymeric synthetic rubber can be a homopolymer, copolymer, or a mixture thereof. Copolymers can be random or block copolymers. Block copolymers can include the polyisobutylene sections in the main backbone, in a side chain, or in both the main backbone and a side chain of the polymer. The polyisobutylene material is typically prepared by polymerizing isobutylene alone or by polymerizing isobutylene plus additional ethylenically unsaturated monomers, such as isoprene, in the presence of a Lewis Acid catalyst such as aluminum chloride, boron trichloride (with titanium tetrachloride as a co-catalyst), or boron trifluoride.

Unfunctionalized isobutylene (co)polymeric rubbers are commercially available from several manufacturers. Homopolymers are commercially available, for example, under the trade designation OPPANOL (e.g., OPPANOL B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole. These homopolymers typically do not have reactive double bonds. It is appreciated that the unfunctionalized (e.g. PIB) synthetic rubber may have a very small concentration of reactive double bonds or other functional groups that are residual to the polymerization thereof. The concentration of such reactive double bonds or other functional groups is typically less than 5, 4, 3, or 2 mol %. Such olefinic unsaturations are also typically not suitable functional groups for formation of covalent bonds via free-radical polymerization.

The compound elastomer composition may comprise 0.1-50 wt. % of the copolymer of Formula I and 50-99.9 wt. % of the non-functional elastomer. 0.1-30 wt. % of the copolymer of Formula I and 70-99.9 wt. % of the non-functional elastomer.

Alternatively, the copolymers of formula I may be added to the non-functional elastomer in amounts such that the siloxane content of the compounded mixture is 0.01-30 wt. %

The two components are normally mixed together is a suitable organic solvent in amounts of 1 to 50 wt. % total solids. Useful solvents include volatile liquid hydrocarbon solvents such as isooctane, octane, cyclohexane, neopentane and the like; as well as volatile solvents such as ethyl acetate, tetrahydrofuran, toluene may be used.

The coating composition, comprising the siloxane-functional isobutylene copolymer, the non-functional elastomer and solvent, may be coated on any suitable substrate including a variety of flexible and inflexible substrates using conventional coating techniques. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl (meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The coating composition may be coated onto by various conventional coating technologies, including, but not limited to, spray techniques, gravure, immersion (dipping) techniques, and the like. The solids concentration in the solvent should be sufficient to achieve the desired performances of the resulting coating upon drying. In general, the solids is disposed in the solvent preferably at a concentration of 0.1 to 15% by weight; more preferably 0.5 to 10%; most preferably 1 to 5%. All or a part of a substrate may be coated. Once the coating composition is deposited on the substrate, the solvent can be volatilized off, providing a coated substrate.

The copolymers of Formula 1 may also be used to make shaped articles when compounded with elastomers. During the manufacturing process (particularly where injection molding is used) the elastomers generally adhere to the surface of the mold. As a result, a shaped article prepared from an elastomer is frequently torn or damaged when removed from the mold. Also, the incorporation of a mold release agent into the polymer can have serious adverse effects on the physical properties of the cured composition (e.g., Mooney Scorch, shrinkage, and compression set) which can limit the successful commercial use of the cured composition. Deposits of polymer on the mold cavity surface ("mold fouling") and poor release of the shaped, article from the mold are major reasons for defects, resulting in rejection of the article (which then adds to the expense of manufacturing such articles).

Shaped articles (e.g., fibers, films and molded or extruded articles such as gaskets seals and o-rings, blow-molded articles and extruded films) of this invention can be made, e.g., by blending or otherwise uniformly mixing the functional copolymer and the non-functional elastomer, for example by intimately mixing the functional copolymer with pelletized or powdered non-functional elastomer, and melt extruding the mixture into shaped articles such as pellets, fibers, or films by known methods. The components can be mixed per se or can be mixed in the form of a "masterbatch" (concentrate) of the oligomer in the polymer. Masterbatches typically contain from about 10% to about 25% by weight of the functional copolymer. Also, an organic solution of the functional copolymer may be mixed with the powdered or pelletized elastomer, the mixture dried to remove solvent, then melted and extruded into the desired shaped article. Alternatively, molten functional copolymer (as a compound (s) or masterbatch) can be injected into a molten elastomer stream to form a blend just prior to extrusion into the desired shaped article.

EXAMPLES

Abbreviations

PDMS—polydimethylsiloxane
BPIB—Brominated polyisobutylene co-polymer

TABLE 1

Materials

| Name | Manufacturer | Material |
| --- | --- | --- |
| BPIB | Lanxess (Pittsburg, PA) | Lanxess Bromobutyl 2030 - Brominated poly(isobutylene-co-isoprene); Br content 1.8 ± 0.2 % |
| Toluene | Alfa Aesar | |
| Acetone | Alfa Aesar | |
| Catalyst | Gelest (Morrisville, PA) | SIP6830.3 - Platimum-divinyltetramethyl siloxane complex (3-3.5% Pt) |
| PDMS1 | Gelest | MCR-H07 - monohydride terminated PDMS (MW 800-900) |
| PDMS2 | Gelest | MCR-H21 - monohydride terminated PDMS (MW 4000-5000) |
| PDMS3 | Gelest | MCR-C18 - mono carbinol terminated PDMS (MW ~5000) |
| UDA | Sigma Aldrich | 10-Undecenoic Acid |
| DAA | Sigma Aldrich | Diallyl amine |
| TEA | Sigma Aldrich | Triethylamine |
| TBAB | Sigma Aldrich | Tetrabutylammonium bromide |
| Hostaphan ® 3SAB | Mitsubishi Polyester Film, Inc. (Greer SC) | primed polyester film |

Reference Example 1

Preparation of Polymer A

In a three-neck, round-bottomed flask equipped with a reflux condenser, thermometer, and a nitrogen inlet were placed 12.2 g BPIB, 0.61 g UDA, 0.22 g TBAB, and 48.8 g toluene. The contents of the flask were stirred with a magnetic stir bar under nitrogen atmosphere at room temperature. Once all the components completely dissolved, the flask was heated to 105° C. After 3 hours, the reaction was cooled to room temperature. The solution was poured into acetone to coagulate the modified polymer. The isolated polymer was washed with fresh acetone 3 times to remove residual UDA and TBAB. Polymer A (10-Undecenoic acid grafted PIB) was then filtered and dried in a vacuum oven for 12 hours at 50° C.

Reference Example 2

Preparation of Polymer B

A polymer was prepared according to the procedure for Reference Example 1 except that the starting materials were 14.0 g BPIB, 0.37 g DAA, 0.48 g TEA and 56 g toluene. After dissolving the materials at room temperature, heating the reaction to 105° C. for 3 hours, and then cooling to room temperature, the contents of the flask were vacuum filtered through a fritted funnel (5 micrometer pore size) to remove the HBr-TEA salt formed during the reaction. The filtrate was poured into acetone to coagulate the modified polymer. The isolated polymer was washed with fresh acetone 3 times to remove residual DAA and TEA. Polymer B (diallylamine grafted PIB) was then filtered and dried in a vacuum oven for 12 hours at 50° C.

Example 1

In a three-neck, round-bottomed flask equipped with a reflux condenser, thermometer, and a nitrogen inlet was placed 5.0 g Polymer A, 2.0 g PDMS1, 0.05 g catalyst, and 20.0 g toluene. The contents of the flask were stirred with a magnetic stir bar under nitrogen at 60° C. After 6 hours, the reaction was cooled to room temperature and the solution was poured into acetone to coagulate the PDMS grafted polymer. The isolated polymer was washed with fresh acetone 3 times to remove unreacted PDMS and catalyst. The PDMS grafted PIB polymer was then dried in a vacuum oven for 12 hours at 50° C. Based on NMR analysis, the PDMS grafted PIB polymer contained 3.2 wt. % PDMS.

Example 2

A PDMS grafted PIB polymer was prepared according to the procedure of Example 1 except that the starting materials were 10.0 g Polymer A, 5.0 g PDMS2, 0.067 g catalyst, and 40 g toluene, and the reaction in the flask was stirred with a magnetic stir bar under nitrogen at 60° C. for 24 hours. Based on NMR analysis, the PDMS grafted PIB polymer contained 21.1 wt. % PDMS.

Example 3

A PDMS grafted PIB polymer was prepared according to the procedure of Example 1 except the starting materials were 10.0 g Polymer A, 5.0 g PDMS1, 0.042 g catalyst and 40 g toluene, and the contents of the flask were stirred with a magnetic stir bar under nitrogen at 108° C. for 24 hours. Based on NMR analysis, the PDMS grafted PIB polymer contained 28.0 wt. % PDMS.

Example 4

A PDMS grafted PIB polymer was prepared according to the procedure of Example 2 except that the starting materials were 10 g Polymer B, 5.0 g PDMS2, 0.067 g catalyst, and 40 g toluene. Based on NMR analysis, the PDMS grafted PIB polymer contained 29.5 wt. % PDMS.

Example 5

Polymer B-2: PDMS Grafted PIB (Grafted PDMS: 39.8 wt. %)

A PDMS grafted PIB polymer was prepared according to the procedure of Example 2 except the starting materials were 10 g Polymer B, 7.5 g PDMS2, 0.08 g catalyst, and 40 g toluene, and the contents of the flask were stirred with a magnetic stir bar under nitrogen at 100° C. for 48 hours. Based on NMR analysis the PDMS grafted PIB polymer contained 39.8 wt. % PDMS.

Example 6

A PDMS grafted PIB polymer was prepared according to the procedure of Example 1 except the starting materials were 10 g BPIB, 2.5 g PDMS3, 0.16 g TBAB and 40 g toluene, and the contents of the flask were stirred under nitrogen at 110° C. for 4 hours. Based on NMR analysis, the PDMS grafted PIB polymer contained 20.0 wt. % PDMS.

Example 7

A PDMS grafted PIB polymer was prepared according to the procedure of Example 6 except the starting materials were 10.0 g BPIB, 4.3 g PDMS3, 0.27 g TBAB and 40 g toluene. Based on NMR analysis, the PDMS grafted PIB polymer contained 29.6 wt. % PDMS.

Examples 8 to 10 and Comparative Examples C1-C3

Preparation of PIB Solutions Containing PDMS Grafted PIB Polymers

Solutions with 10% solids were prepared with the compositions shown in Table 2 by dissolving the PIB alone or the PDMS grafted PIB in 100 mL jars on a roller mill overnight. The PIB/PDMS polymers were from Examples 1, 4, and 7.

TABLE 2

| Ex | BPIB (wt. %) | PDMS or PDMS/PIB (wt. %) | Toluene (wt. %) | Homogeneity after mixing |
|---|---|---|---|---|
| C1 | 10% | — | 90 | Transparent, homogeneous |
| 8 | 6% | Example 2 (4%) | 90 | Transparent, homogeneous |
| 9 | 6% | Example 4 (4%) | 90 | Transparent, homogeneous |
| 10 | 6% | Example 7 (4%) | 90 | Transparent, homogeneous |

The solutions of Examples C1 and Examples 8-10 were knife coated onto the primed side of 15.2 cm by 63.5 cm sheets of polyester film (Hostaphan® 3SAB) to a thickness of about 10 mils wet. The coated films were dried in an oven set at 70° C. for 20 minutes to provide a tape having a coating thickness of about 1 mil. The coatings were conditioned at 23° C., 50% relative humidity for 24 hours before they were measured for coefficient of friction.

The tactile friction test was used to determine the coefficient of friction of the coatings. The test was conducted with a multicomponent dynamometer (MiniDyn 9269C) with a force plate. The dynamometer was attached to a dual mode amplifier (5010B). Both instruments were obtained from Kistler Instrument Corp., Novi, Mich. The test measured the dynamic coefficient of friction (COF) which is the unitless factor relating the normal force applied to the lateral, i.e., frictional, force of a finger as it is dragged along the surface of the force plate. The drag is a sensory evaluation of the friction between two surfaces (skin and the cured coatings) quantified by the coefficient of friction.

A strip of the coated test material was attached to the surface of the force plate using a removable tape. To prepare the test subject's skin for measuring, the hands were washed with a mild detergent to remove any surface oils, and dried with a paper towel. Then the subject's index finger was immersed for 20 seconds in sufficient de-ionized water to fully cover the area of the finger that will contact the test surface, and then dried with an absorbent paper towel.

The test subject's finger is positioned at one end of the strip of test material at an angle of about 30 degrees from the normal and dragged along the strip, increasing the force from about 0.5 to about 10 Newtons. After each pass, the subject's finger was re-immersed in de-ionized water for 20 seconds and dried for the next pass. The process was repeated 8 times over about 4 minutes for each test strip. The normal and lateral force data was recorded for each pass and converted to coefficient of friction (COF) values at the normal forces from 1 to 5 Newtons (1N, 2N, etc.) shown in Table 3. Each value is the average of 8 passes.

TABLE 3

| | Silicone content in dry | Coefficient of Friction | | | | |
|---|---|---|---|---|---|---|
| Ex | film (wt. %) | 1N | 2N | 3N | 4N | 5N |
| C1 | 0 | 3.5 ± 0.5 | 3.5 ± 0.3 | 2.4 ± 0.1 | 2.0 ± 0.1 | 1.5 ± 0.2 |
| 8 | 8 | 0.8 ± 0.1 | 0.8 ± 0.1 | 0.8 ± 0.1 | 0.8 ± 0.1 | 0.6 ± 0.1 |
| 9 | 12 | 0.8 ± 0.1 | 0.7 ± 0.1 | 0.7 ± 0.1 | 0.7 ± 0.1 | 0.5 ± 0.1 |
| 10 | 12 | 0.8 ± 0.1 | 0.6 ± 0.1 | 0.6 ± 0.1 | 0.5 ± 0.1 | 0.5 ± 0.1 |

This disclosure provides the following embodiments:

1. A composition comprising a copolymer of the formula:

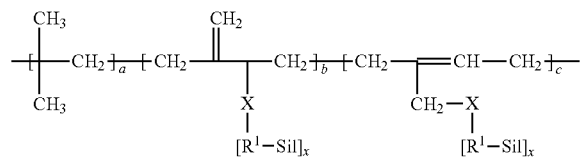

wherein
a is at least 20, and at least one of b and c are at least one;
X is oxygen or nitrogen;
$R^1$ is a covalent bond or a divalent (hetero)hydrocarbyl group;
Sil is a polydialkylsiloxane, and
x is 1 or 2.
2. The composition of embodiment 1 wherein the weight percent of the Sil groups in the copolymer is greater than 0.1 to less than 70 wt. %.
3. The composition of any of the previous embodiments wherein X is oxygen and x is 1, or X is nitrogen and x is 1 or 2.
4. The composition of any of the previous embodiments wherein —X—$R^1$— is of the formula: —O—CO—$R^2$—, where $R^2$ is an alkylene.
5. The composition of any of the previous embodiments wherein $R^1$ is an alkylene.
6. The composition of any of the previous embodiments wherein $R^1$ is "—O—$R^{13}$—O—$R^{14}$—, where $R^{13}$ and $R^{14}$ are alkylene.

7. The composition of any of the previous embodiments, wherein Sil is of the formula:

formula:

$$-\left[\begin{array}{c}R^3\\|\\Si-O\\|\\R^3\end{array}\right]_y\left[\begin{array}{c}R^6\\|\\Si-O\\|\\R^6\end{array}\right]_z\begin{array}{c}R^3\\|\\Si-R^5\\|\\R^3\end{array} \quad I$$

wherein $R^3$ is each independently an alkyl, or aryl group;
$R^5$ is each independently an alkyl, aryl, or $-Si(R^3)_2R^5$;
$R^6$ is each independently an alkyl, aryl, or $-Si(R^3)_2R^5$;
z is 0 to 200; preferably 1-75; and
y is at least 3.

8. The composition of embodiment 7 wherein Sil is of the formula:

$$-\left[\begin{array}{c}R^7\\|\\Si-O\\|\\R^7\end{array}\right]_z\begin{array}{c}R^7\\|\\Si-R^7\\|\\R^7\end{array} \quad II$$

wherein each $R^7$ is independently an alkyl, and z is at least 3.

9. A method of preparing the copolymer of any of the previous embodiments comprising the steps of hydrosilation of an isobutylene/isoprene copolymer having a pendent unsaturated group by a hydrido polydiorganosiloxane.

10. The method of embodiment 9 wherein the isobutylene/isoprene copolymer having a pendent unsaturated groups is prepared by nucleophilic displacement of a halogenated isobutylene/isoprene copolymer by an unsaturated compound having a nucleophilic functional group.

11. The method of embodiment 10 wherein the unsaturated compound having a nucleophilic functional group is an unsaturated alcohol, amine or carboxylic acid.

12. The method of embodiment 10 wherein the nucleophilic ethylenically unsaturated compound is of the formula:

$$-X^1-R^8-\left[\begin{array}{c}R^9\\|\\C=C\\|\\R^9\end{array}\right]_q$$

wherein $X^1$ is $-O-$, $-O_2C-$, $-NR^{10}-$, where $R^{10}$ is H or $C_1-C_4$ alkyl, or $-R^8-C(R^9)=CR^9_2$; $R^8$ is a multivalent saturated or unsaturated alkylene or arylene, and each $R^9$ is independently selected from H or $C_1-C_4$ alkyl, and any two of the $R^9$ groups may be taken together to form a carbocyclic ring.

13. The method of embodiment 9 wherein the hydrido polydiorganosiloxane is of the formula:

$$H-\left[\begin{array}{c}R^3\\|\\Si-O\\|\\R^3\end{array}\right]_y\left[\begin{array}{c}R^6\\|\\Si-O\\|\\R^6\end{array}\right]_z\begin{array}{c}R^3\\|\\Si-R^5\\|\\R^3\end{array};$$

wherein $R^3$ is each independently an alkyl, or aryl group;
$R^5$ is each independently an alkyl, aryl, or $-Si(R^3)_2R^5$;
$R^6$ is each independently an alkyl, aryl, or $-Si(R^3)_2R^5$;
z is 0 to 20; preferably 1-75; and
y is at least 10, and at least one of said $R^5$ or $R^6$ groups is H.

14. A coating composition comprising the copolymer of any of embodiments 1-8 and a non-functional elastomer.

15. The coating composition of embodiment 14 comprising:
a) 0.1-50 wt. % of the copolymer, and
b) 50-99.9 wt. % of the non-functional elastomer.

16. The coating composition of embodiments 13 or 14 wherein the non-functional elastomer is selected from polyisobutylenes, polyisoprenes, polybutadiene, butyl rubber, halogenated butyl rubbers, dienes, styrene rubber copolymers, acrylonitriles, and copolymers or mixtures thereof.

What is claimed is:

1. A composition comprising a copolymer of the formula:

$$-\left[\begin{array}{c}CH_3\\|\\C-CH_2\\|\\CH_3\end{array}\right]_a\left[CH_2-\begin{array}{c}CH_2\\\|\\C\\|\\X\\|\\[R^1-Sil]_x\end{array}-CH_2\right]_b\left[CH_2-C=CH-CH_2\\\qquad\qquad|\\\qquad\qquad CH_2-X\\\qquad\qquad\quad|\\\qquad\qquad\quad[R^1-Sil]_x\right]_c-$$

wherein a is at least 20, and at least one of b and c are at least one;
X is oxygen or nitrogen;
$R^1$ is a covalent bond or a divalent (hetero)hydrocarbyl group;
Sil is a polydialkylsiloxane, and
x is 1 or 2.

2. The composition of claim 1 wherein the weight percent of the Sil groups in the copolymer is greater than 0.1 to less than 70 wt. %.

3. The composition of claim 1 wherein X is oxygen and x is 1, or X is nitrogen and x is 1 or 2.

4. The composition of claim 1 wherein $-X-R^1-$ is of the formula: $-O-CO-R^2-$, where $R^2$ is an alkylene.

5. The composition of claim 1 wherein $R^1$ is an alkylene.

6. The composition of claim 1 wherein $R^1$ is $-R^{13}-O-R^{14}$, where $R^{13}$ and $R^{14}$ are alkylene.

7. The composition of claim 1, wherein Sil is of the formula:

$$-\left[\begin{array}{c}R^3\\|\\Si-O\\|\\R^3\end{array}\right]_y\left[\begin{array}{c}R^6\\|\\Si-O\\|\\R^6\end{array}\right]_z\begin{array}{c}R^3\\|\\Si-R^5\\|\\R^3\end{array} \quad I$$

wherein $R^3$ is each independently an alkyl, or aryl group;
$R^5$ is each independently an alkyl, aryl, or —Si($R^3$)$_2R^5$;
$R^6$ is each independently an alkyl, aryl, or —Si($R^3$)$_2R^5$;
z is 0 to 200; preferably 1-75; and
y is at least 3.

8. The composition of claim 7 wherein Si1 is of the formula:

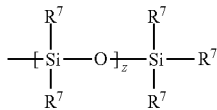
II wherein each $R^7$ is independently an alkyl, and z is at least 3.

9. A method of preparing the composition of claim 1 where the copolymer is made by the steps of hydrosilation of an isobutylene/isoprene copolymer having a pendent unsaturated group by a hydrido polydiorganosiloxane.

10. The method of claim 9 wherein the isobutylene/isoprene copolymer having a pendent unsaturated groups is prepared by nucleophilic displacement of a halogenated isobutylene/isoprene copolymer by an unsaturated compound having a nucleophilic functional group.

11. The method of claim 10 wherein the unsaturated compound having a nucleophilic functional group is an unsaturated alcohol, amine or carboxylic acid.

12. The method of claim 10 wherein the nucleophilic ethylenically unsaturated compound is of the formula:

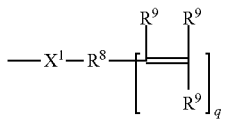

wherein $X^1$ is —O—, —O$_2$C—, —NR$^{10}$—, where $R^{10}$ is H or $C_1$-$C_4$ alkyl, or —$R^8$—C($R^9$)=CR$^9_2$; $R^8$ is a multivalent saturated or unsaturated alkylene or arylene, and each $R^9$ is independently selected from H or $C_1$-$C_4$ alkyl, and any two of the $R^9$ groups may be taken together to form a carbocyclic ring.

13. The method of claim 9 wherein the hydrido polydiorganosiloxane is of the formula:

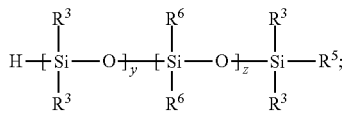

wherein $R^3$ is each independently an alkyl, or aryl group;
$R^5$ is each independently an alkyl, aryl, or —Si($R^3$)$_2R^5$;
$R^6$ is each independently an alkyl, aryl, or —Si($R^3$)$_2R^5$;
z is 0 to 20; preferably 1-75; and
y is at least 10, and at least one of said $R^5$ or $R^6$ groups is H.

14. A coating composition comprising the copolymer of claim 1 and a non-functional elastomer.

15. The coating composition of claim 14 comprising:
a) 0.1-50 wt. % of the copolymer, and
b) 50-99.9 wt. % of the non-functional elastomer.

16. The coating composition of claim 14 wherein the non-functional elastomer is selected from polyisobutylenes, polyisoprenes, polybutadiene, butyl rubber, halogenated butyl rubbers, dienes, styrene rubber copolymers, acrylonitriles, and copolymers or mixtures thereof.

\* \* \* \* \*